United States Patent [19]

Laramore

[11] Patent Number: 4,636,301

[45] Date of Patent: Jan. 13, 1987

[54] DUSTING FLOUR RECYCLING SYSTEM

[76] Inventor: William D. Laramore, P.O. Drawer 1977, Thomasville, Ga. 31792

[21] Appl. No.: 785,670

[22] Filed: Oct. 9, 1985

[51] Int. Cl.$^4$ ................................................. B04C 9/00
[52] U.S. Cl. ........................................ 209/31; 209/32; 209/144; 55/284; 55/293; 55/302; 55/315; 55/324; 55/337; 55/459 R; 55/481; 55/418; 425/104; 425/232; 15/345
[58] Field of Search ................ 55/293, 315, 283, 284, 55/302, 337, 418, 324, 459 R, 481, 484; 209/144, 30, 31; 425/104, 232, 230, 363, 373; 15/345; 406/109, 136, 171, 137, 173

[56] References Cited

U.S. PATENT DOCUMENTS

| | | | |
|---|---|---|---|
| 862,695 | 8/1907 | Baldwin | 15/345 |
| 2,276,805 | 3/1942 | Tolman | 55/302 |
| 2,343,682 | 3/1944 | McCurdy | 55/459 R |
| 2,779,468 | 1/1957 | King et al. | 209/144 |
| 2,836,256 | 5/1958 | Caskey | 55/293 |
| 3,224,171 | 12/1965 | Bowman | 55/478 |
| 3,239,863 | 3/1966 | Gardner | 15/345 |
| 3,703,957 | 11/1972 | Swanson et al. | 209/144 |
| 3,868,238 | 2/1975 | Mills, Jr. | 55/302 |
| 3,948,623 | 4/1976 | Ostby et al. | 55/284 |
| 4,123,213 | 10/1978 | Laramore | 425/104 |

Primary Examiner—Bernard Nozick
Attorney, Agent, or Firm—B. P. Fishburne, Jr.

[57] ABSTRACT

A flour recycling system includes a compressed air and vacuum head placed over a bakery product conveyor line. Flour is removed from the product units and is conveyed through a vacuum hose to the inlet of a remotely located dual stage separator in which the flour with entrained dough particles is subjected to a two-stage vacuum induced centrifugal separating process. Cleansed flour is drawn by vacuum through two fine mesh sifter screens into two reclaimed flour tanks each containing a vortex eliminator and each having an air release bag. Reclaimed flour is delivered to storage receptacles beneath the tanks through elongated flexible chutes which can be tied off and closed at desired elevations. The tanks, their air release bags and flexible chutes can be individually vacuum cleaned without shutting down the system merely by stopping the operation of one blower while continuing to operate the other blower of the dual blower system, one for each tank.

16 Claims, 8 Drawing Figures

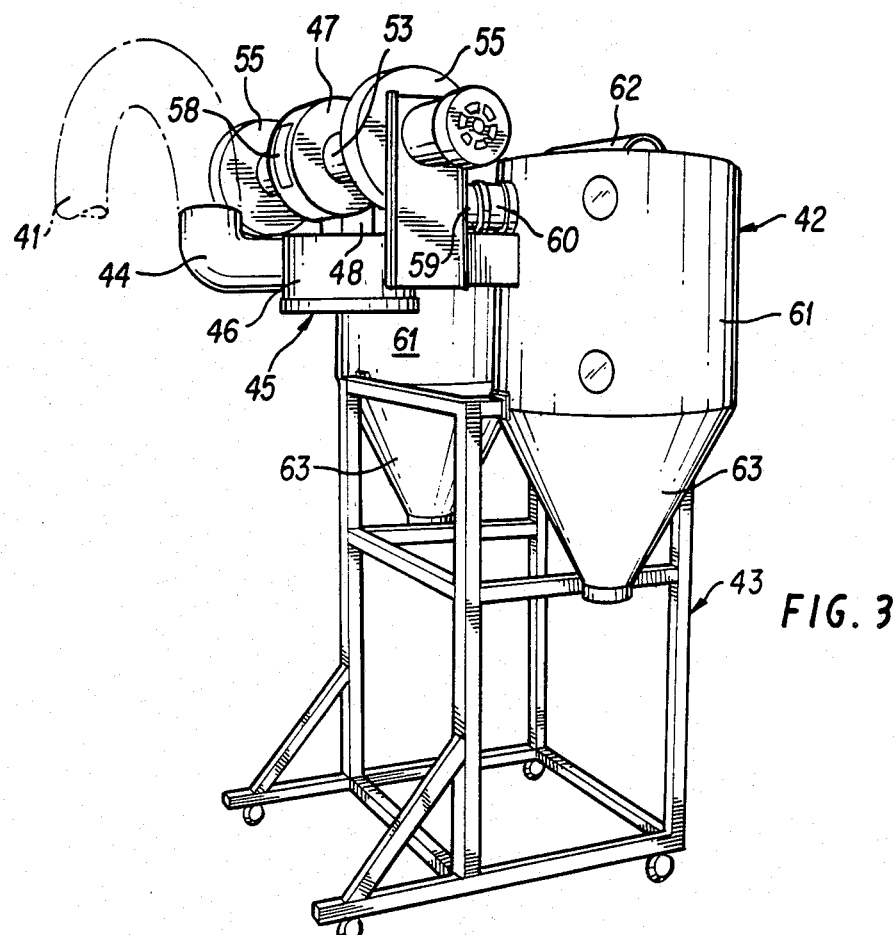
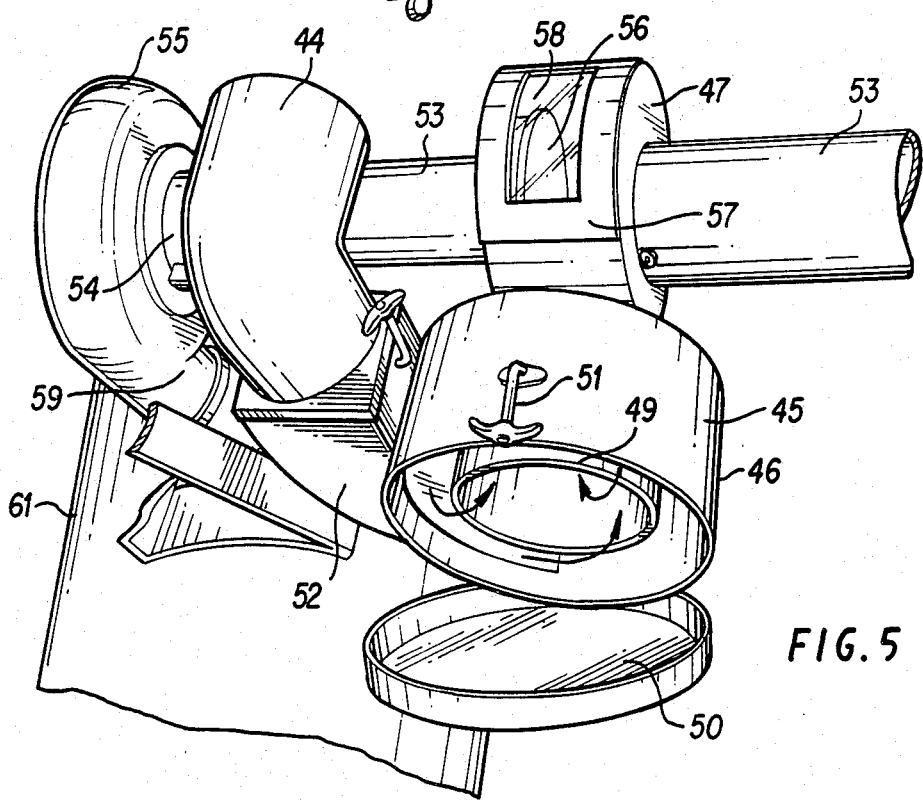
FIG. 3
FIG. 5

DUSTING FLOUR RECYCLING SYSTEM

BACKGROUND OF THE INVENTION

U.S. Pat. No. 4,123,213, Laramore, discloses a vacuum system for dusting floor to allied bakery products as they are being transferred from a dough dividing and rounding machine to an aging and panning machine.

The present invention relates to a broadly similar dusting flour recycling system which constitutes an improvement on the prior patented system, in terms of increased efficiency of operation, greater versatility of usage and increased economies resulting from the use of the invention in high production bakery facilities, such as those producing hamburger and hot dog rolls, and the like.

More particularly, the advantages derived from the installation and operation of the dusting flour recycling system according to the present invention include, among others:

(1) Reclaims a greater quantity of clean reusable flour, up to approximately 13 pounds per hour for a single installation of the system.

(2) The virtual elimination of unhealthy flour dust from the air of the commercial bakery in which the invention is installed and used.

(3) Greatly improved sanitation throughout the bakery in contrast to heavy contamination of exposed surfaces with flour when no recycling system is used.

(4) Major reduction in labor costs for clean-up operations, and much less frequent cleaning of premises required.

(5) System has the capability of eliminating dusting flour on the bottom surface of the finished product as well as on all other exposed surfaces.

(6) The use of the system greatly extends the life of the baking pan glaze by preventing contamination of the glaze with flour, later to become baked on the pans.

(7) System thoroughly filters the reclaimed flour, making it ready for reuse in the dusting of bakery products.

(8) The vacuum system can be located remotely (80 feet or more) from the product line without the flour settling out in the pipe connecting the vacuum system with the head which spans the top of the sheeted product conveyor line.

SUMMARY OF THE INVENTION

A flour recycling system includes a compressed air and vacuum head placed over a sheeted bakery product conveyor line immediately downstream from sheeting rollers which act on aged dough balls as they are discharged from the aging and panning machine or "Panomat". In the compressed air and vacuum head, the sheeted dough pieces are cleansed of flour on all surfaces including their bottoms. The flour removed from the dough pieces along with any dough particles is conveyed through a hose of any required length up to 80 feet or more to the inlet of a dual section separator in which the flour and any entrained dough particles and debris are subjected to a two-stage vacuum induced centrifugal action. In the second stage, the cleansed flour is drawn by vacuum through fine mesh screens while the removed dough particles and debris settle by gravity in the first stage separation chamber from which they can be removed at proper intervals.

The cleansed flour, after traversing the screens, is forced into two upright axis reclaimed flour tanks, each containing a vortex eliminator through which the incoming flour must pass when entering the tank. Each tank is topped by a fabric air release bag. Each tank includes a lower tapered outlet section mounting a vibrator and leading to an elongated flour outlet chute or sock through which recycled flour is delivered at proper times into receiver containers placed beneath the tanks without the escape of flour dust into the surrounding atmosphere.

A very unique feature of the system is its ability to self clean the air release bags and reclaimed flour tanks cyclically without shutting down the system. This cleaning can be accomplished under manual control or by the operation of an automatic timer. When done manually, the on-off switch for the blower of one tank is turned off during the emptying of that tank and the blower of the other tank is allowed to remain running. This enables a thorough vacuum cleaning of the air release bag, tank and flour discharge sleeve, while the flour recycling system continues to operate with relatively little loss of efficiency. The blower associated with one tank and its air release bag causes the vacuum cleaning of the other tank and its air release bag while continuing to recycle flour.

The vacuum cleaning can be carried out in an automatic mode by a conventional automatic timer which can alternately turn off the blowers approximately every ten minutes, for a period of fifteen to twenty seconds, by operating the on-off switches of the blowers. The same beneficial results are obtained with automatic or manual control of the blower on-off switches, although automatic timer operation is preferred. In either case, the last remaining flour dust in the tank whose blower is inactive is sucked through the filter screen of the tank whose blower is in operation and into the reclaimed flour tank associated with that blower. In essence, therefore, the system is self-cleaning without the necessity of being totally shut down and without allowing the escape of flour dust into the surrounding atmosphere.

BRIEF DESCRIPTION OF THE DRAWINGS

FIG. 3 is a perspective view of a unitized dual flour recycling tank, separating and vacuum induction assembly mounted on a mobile support stand.

FIG. 5 is a further perspective view, particularly showing the first stage separator.

DETAILED DESCRIPTION

Figure 1:
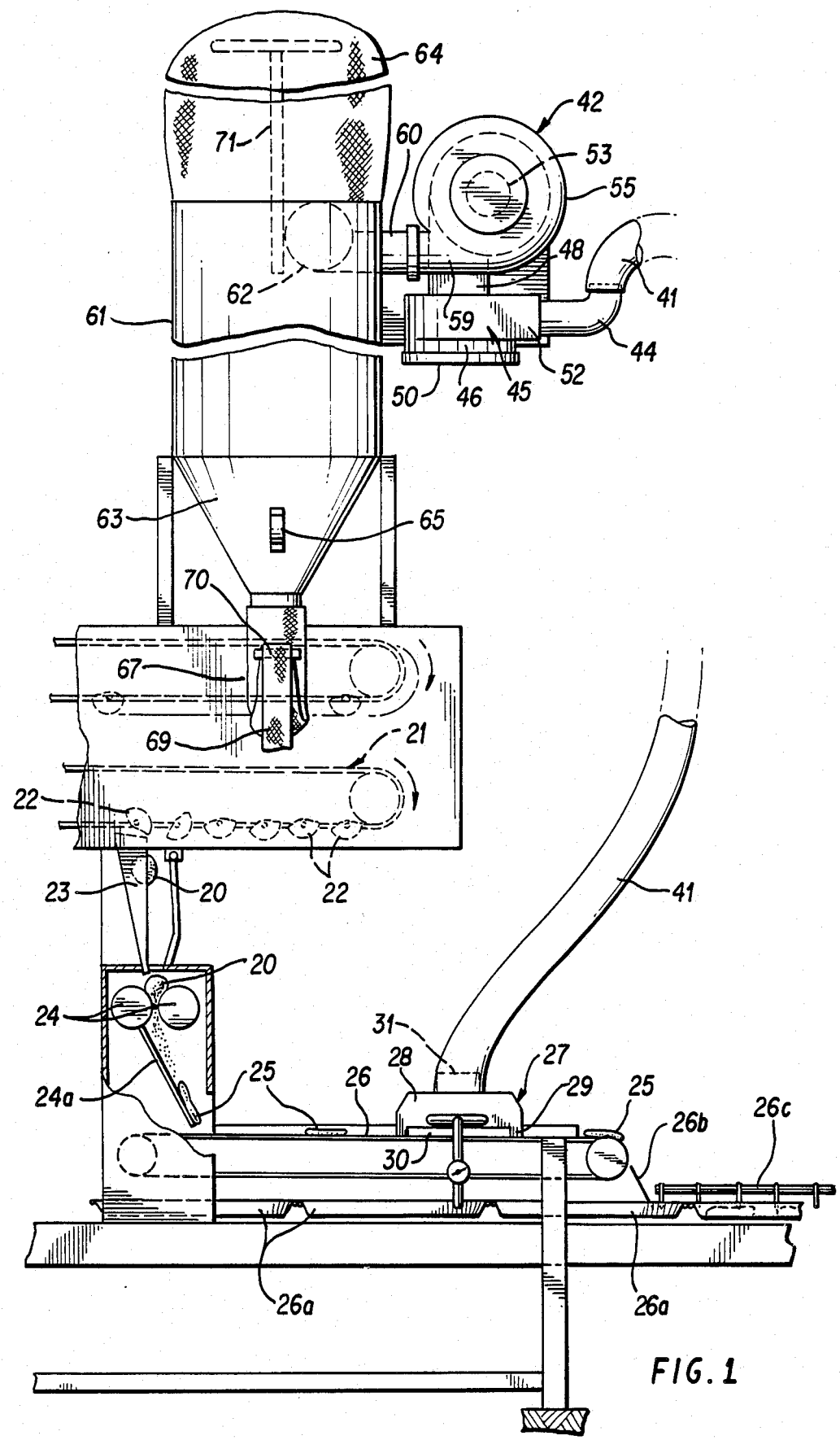
FIG. 1 is a side elevation of a dusting flour recycling system according to the present invention.
Figure 2:
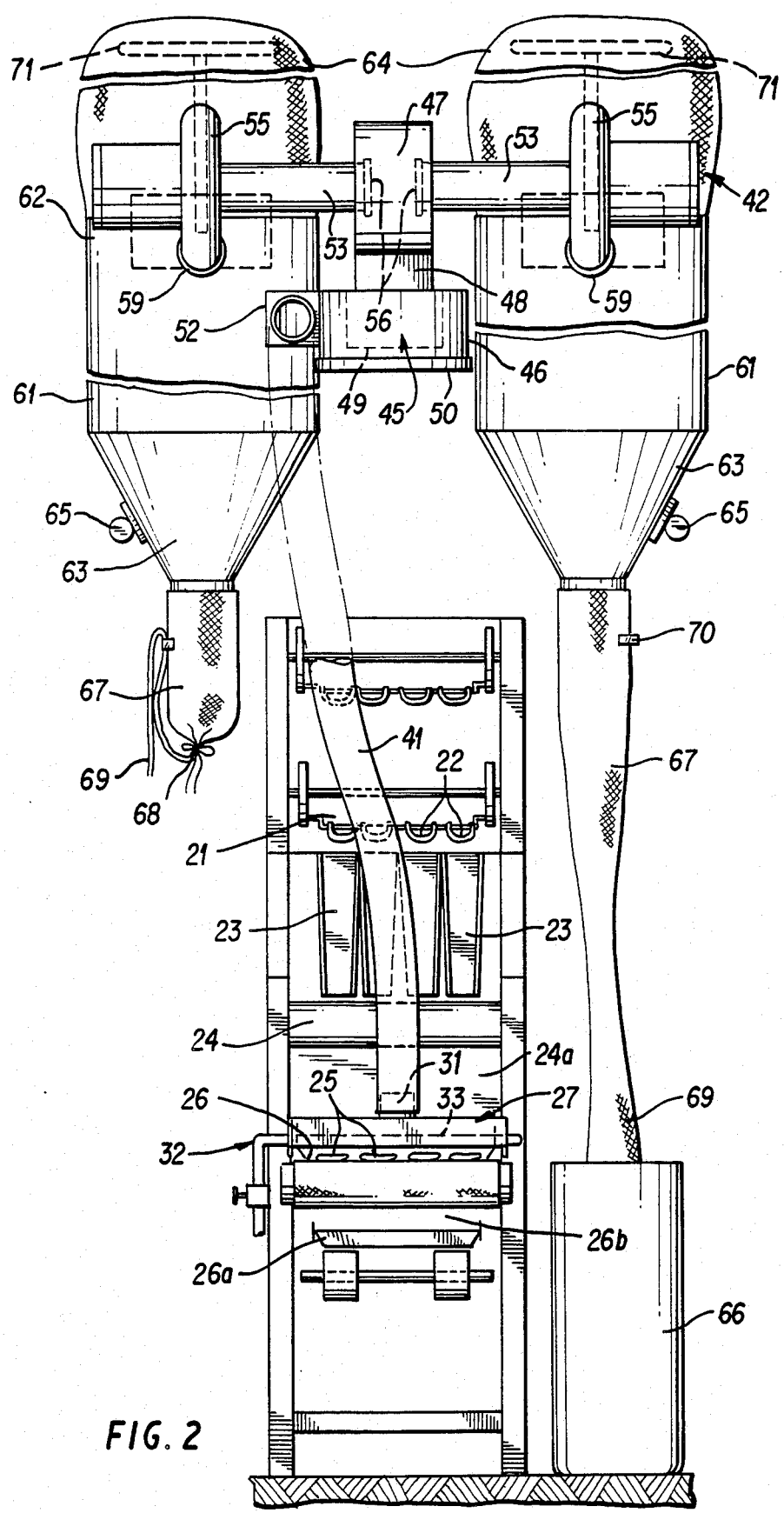
FIG. 2 is an elevational view of the system taken at right angles to FIG. 1.

Referring to the drawings in detail wherein like numerals designate like parts, dough balls 20 are discharged in succession from a "Panomat" aging and panning machine 21 having a multiplicity of dough ball conveyor cups 22. From the "Panomat" 21, the aged dough balls 20 pass downwardly through a chute structure 23 to sheeting rollers 24 which form the dough balls into flat relatively thin dough pieces 25. The sheeted dough pieces 25 move down a steeply inclined apron 24a and onto the top run of a horizontal conveyor 26 beneath which baking pans 26a for hamburger buns or the like are being conveyed horizontally. The pans 26a have a release coating or glaze in accordance with conventional practice. At the downstream end of the conveyor 26, the dough pieces 25 slide down another apron 26b and into pockets provided in the baking pans 26a. The movement of the pans 26a is controlled in a stop and go mode by a conventional oscillating pawl mechanism 26c. All of the apparatus thus far described is conventional and need not be discussed in greater detail.

When the dough balls are delivered to the upstream end of the "Panomat" 21 from a standard dough dividing and forming machine, not shown, a large amount of dusting flour is applied to product, as described in U.S. Pat. No. 4,123,213. Much dusting flour remains on the dough balls 20 as they leave the discharge end of the "Panomat" 21, FIG. 1, and pass through the sheeting rollers 24 and onto the conveyor 26. It is the purpose of the flour recycling system according to the present invention, about to be described, to remove substantially all flour from the dough pieces 25 and deliver this flour in a cleansed and sifted state to receptacles from which the reclaimed flour can be reused as dusting flour or for making additional dough, as need dictates.

The flour recycling system comprises a compressed air and vacuum head 27 disposed immediately above the conveyor belt 26 and spanning the entire width of the belt on which the dough pieces 25 are being transported. The head 27 comprises a hood-like body portion 28 including corner legs 29 which straddle the conveyor belt 26 and rest on the solid surface. Side openings 30 are provided in the hood 28 between the legs 29 for the admission of clean ambient air into the hood. The top wall of the hood carries a central vacuum hose connector sleeve 31 rising therefrom as shown.

Figure 8:
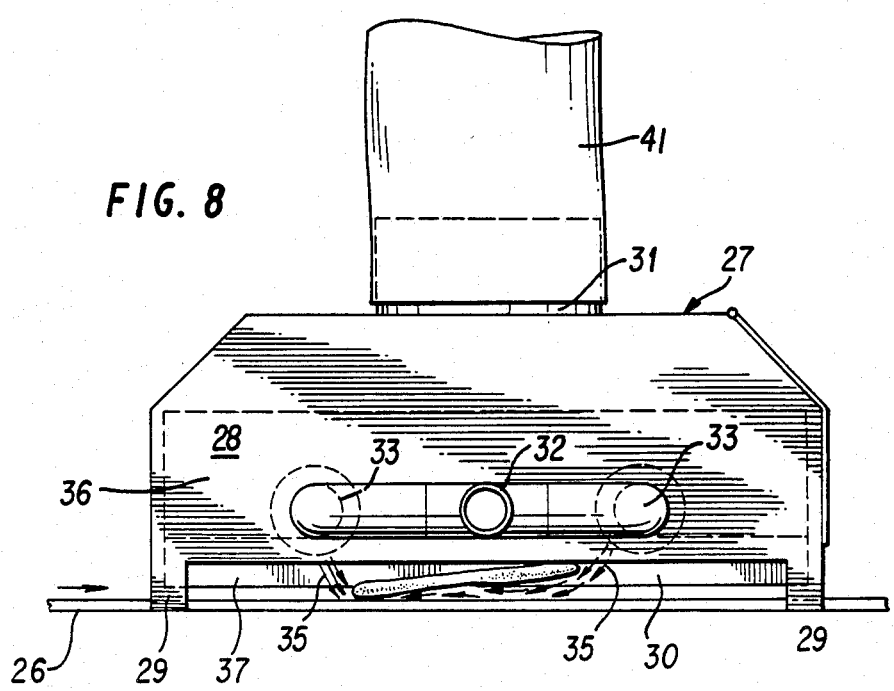
FIG. 8 is an end elevation of the compressed air and vacuum head.
Figure 4:
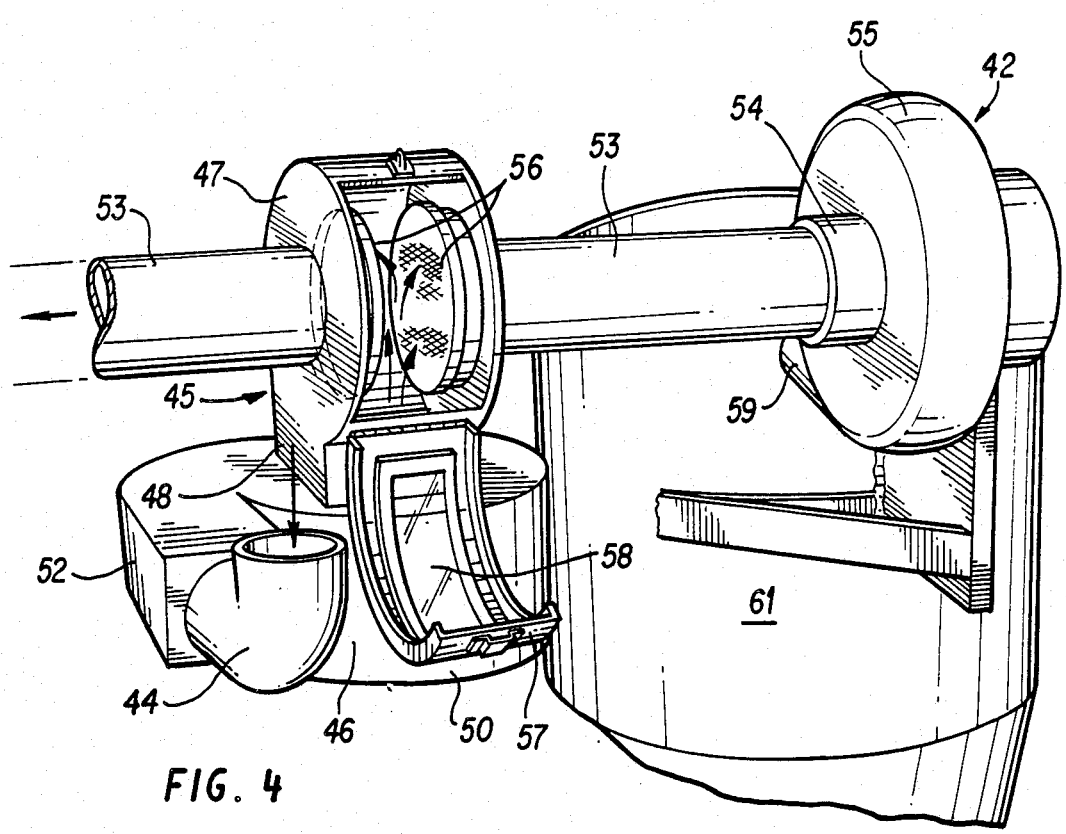
FIG. 4 is a perspective view showing the dual stage separator and filter screen portion of the system.
Figure 6:
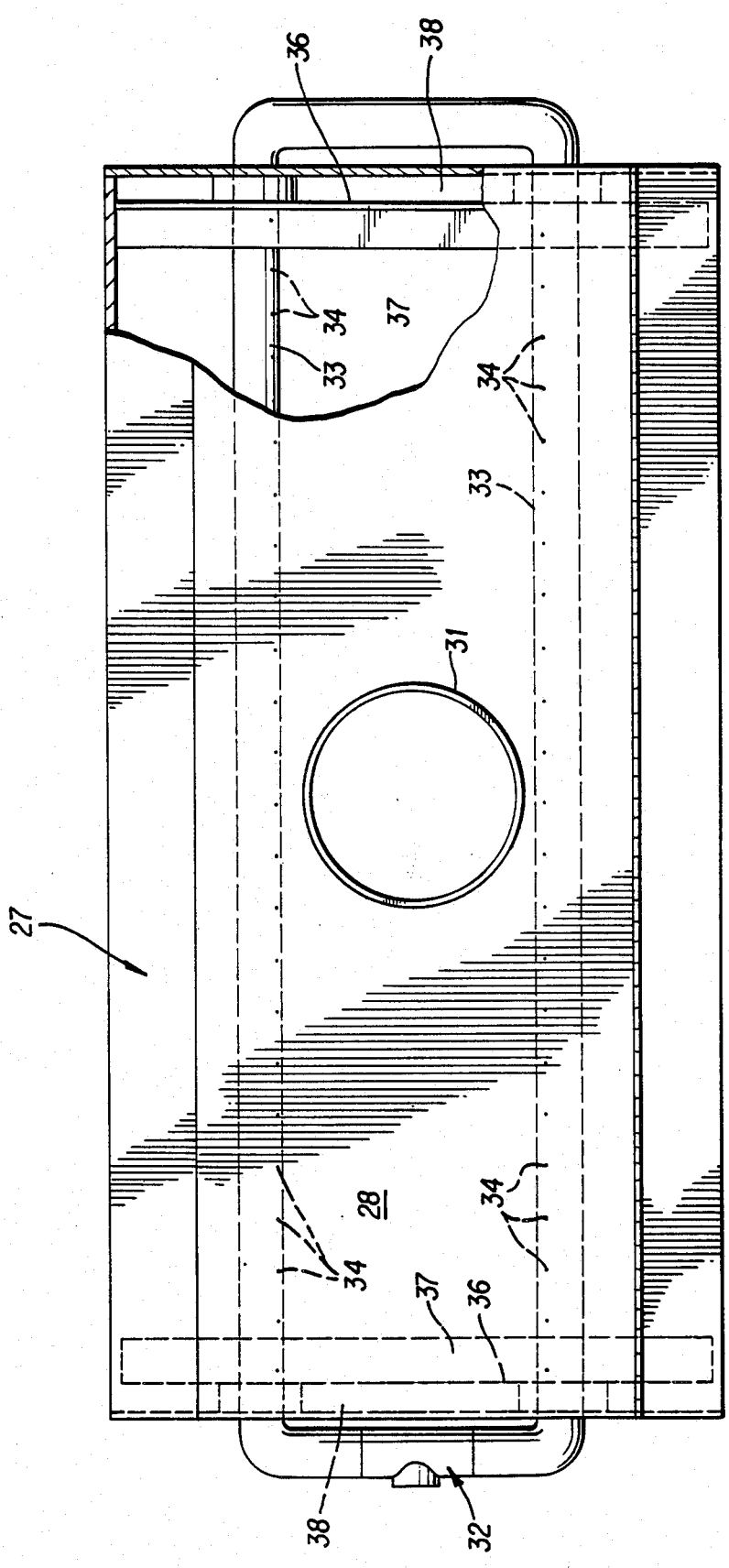
FIG. 6 is a plan view of the product line compressed air and vacuum head.

A compressed air pipe 32 having two spaced parallel branches 33 is arranged as a continuous horizontal loop across the head 27, FIG. 6. The pipe branches 33 are arranged near and inwardly of the upstream and downstream end of the head 27 and are at an elevation somewhat above the outside air inlet openings 30. The pipe branches 33 have spaced apertures 34 along their lengths with their axes converging downwardly to direct multiple stream 35 of compressed air downward at angles to the conveyor belt 26, as shown graphically in FIG. 8. These compressed air streams 35 actually lift the dough pieces 25 slightly from the belt 26 with a dancing action and clean all flour from the bottoms of the dough pieces during their passage through the head 27.

Figure 7:
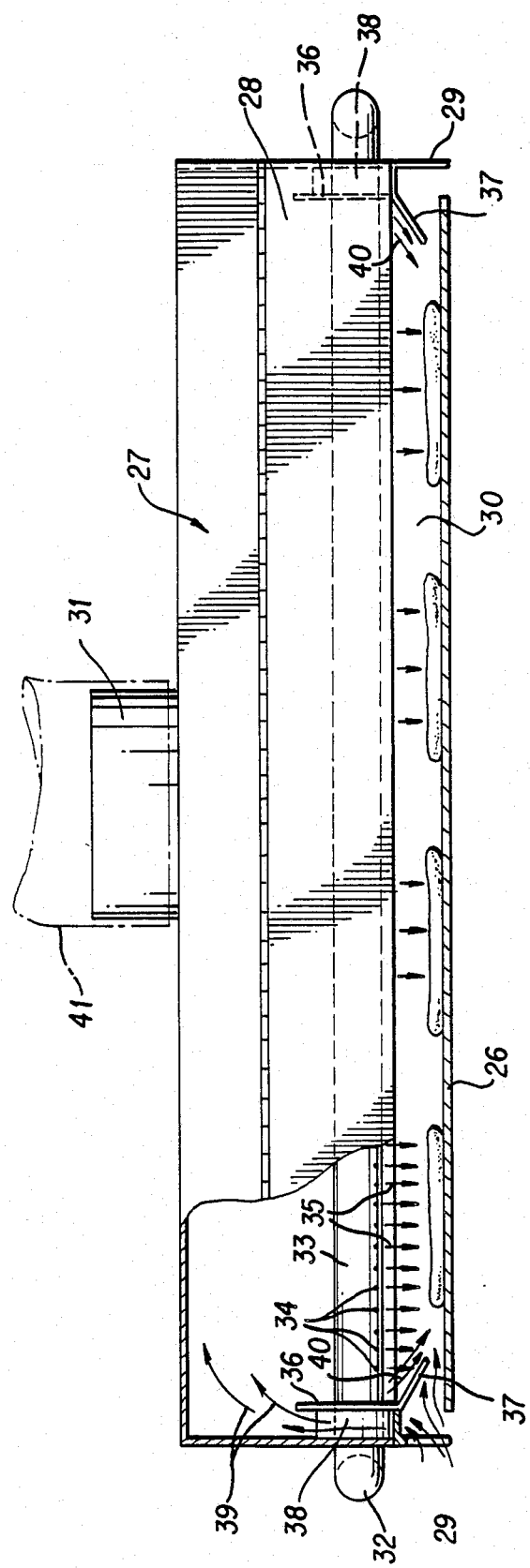
FIG. 7 is a side elevation of the same.

Vertical baffle plates 36 having inclined lower extensions 37 are positioned in the opposite sides of the head 27 to form vertical passages 38 for incoming clean ambient air whose direction of flow is indicated by the lines 39, FIG. 7. The inclined baffle extensions 37 serve to direct compressed air coming from the apertures 34 inwardly at the opposite sides of the head 27, as shown by the directional arrows 40. The baffle extensions 37 also provide passages above the conveyor belt 26 for the admission of fresh air to further suppress dust, as shown in FIG. 7. The vacuum created inside of the head 27 by the means now to be described effectively removes flour from all of the other surfaces of the dough pieces 25 during their passage through the head 27 on the belt 26.

The sleeve 31 is connected through a flexible vacuum hose 41 with a vacuum assembly 42. As best shown in FIG. 3, the unitized assembly 42 can be supported on a wheeled stand 43 for mobility. In practice, the hose 41 can be 80 feet or more in length with no settling out of flour in the hose between the compressed air and suction head 27 and the vacuum assembly 42. It is frequently convenient to locate the assembly 42 remotely from the head 27. However, in some instances, the vacuum assembly 42 can be located relatively near and above the head 27 and conveyor 26, in which case a short vacuum hose 41 is used.

In any case, the end of the hose away from the head 27 is connected to an inlet elbow 44 of a dual stage separator 45 including a first or lower separator stage 46 and a perpendicular axis second or upper stage separator section 47. The first separator stage 46 has a vertical axis and the second stage 47 has a horizontal axis. The two separator stages are in communication through a rectangular sleeve 48 connected into a cylindrical sleeve 49 inside of the first stage housing 46. The lower end of the internal sleeve 49 terminates somewhat above the bottom of the first stage housing 46, FIG. 5. The first stage housing 46 of the separator is equipped with a drop bottom 50 having a retaining latch 51. This arrangement enables periodic dumping of dough particles or other debris which accumulates in the first or lower stage of the dual stage separator 45.

It can be noted that the inlet elbow 44 connects into the lower vertical axis separator stage 46 tangentially through another elbow 52. Similarly, the sleeve 48 connects into the upper horizontal axis separator stage tangentially. Consequently, flour and dough particles drawn through the hose 41 by vacuum from the head 27 are subjected to a first stage centrifugal separating action in the housing 46 around the sleeve 49, and after passing upwardly through the sleeve 49 and rectangular sleeve 48 are subjected to a second stage centrifugal separating action in the housing 47. As a result of the two stages of centrifugal separation, all dough particles or other debris will settle out on the drop bottom 50 for easy emptying and only flour will be elevated into the second stage housing 48 of the separator assembly 45.

Two coaxial horizontal delivery pipes 53 lead from the two vertical end walls of second stage housing 47 and are coupled as at 54 with two independently operable blowers 55, each having an on-off control switch. Within the housing 47 in spaced opposed relationship, the ends of pipes 53 are covered by fine sifting screens 56, preferably 30 mesh screens. Only fine flour of the type suitable for reusing can pass through the screens 56, and all other material will be rejected and will either fall onto the drop bottom 50 or accumulate in the upper housing 47. The upper housing 47 is equipped with a hinged sealed access door 57 having a transparent window 58 through which the two screens 56 may be viewed.

After being drawn by vacuum created by the two blowers 55 through the screens 56, the cleansed flour passes through tangential flour outlets 59 and through coaxial inlet pipes 60 which extend inside of two upright axis flour recycling tanks 61. The inlet pipes 60 connect into vortex eliminators 62 inside of each tank 61, above tapered lower discharge extensions 63 of the tanks. Flour being forced into each tank 61 by one of the blowers 55 must enter the tank through a vortex eliminator 62.

Each tank is equipped at its top with a fabric air release bag 64 through which only clean air is discharged into the surrounding atmosphere.

Each outlet extension 63 has mounted thereon a mechanical vibrator 65 to cause flour to discharge downwardly from each tank 61 and into a suitable collection receptacle 66 below the tank.

To facilitate this discharge of reclaimed flour from the tanks 61, each tapered outlet 63 is equipped at its bottom with an elongated fabric sleeve or sock 67 adapted to be tied off at any elevation by an adjustable tie 68. A long extension 69 of each sleeve 67 is held elevated by a retainer loop 70 on each sleeve 67 near its top. When it is desired to release the flour from each tank 61 for passage through the sleeve 67 to the receptacle 66, the tie 68 is released and the extension 69 is separated from the retainer loop 70 and lowered into the top of the receptacle 66 whereupon flour can pass into the receptacle without creating a cloud of flour dust in the surrounding atmosphere. The blower 55 of the tank being emptied through the sleeve 67 is turned off during the emptying process.

A very unique feature of the flour recycling system resides in its self-cleaning ability without necessitating shut down of the system. This is accomplished in the following manner. Normally, in the operation of the system, both blowers 55 are operating, and flour, plus any dough particles present, are pulled by suction from the head 27 and through both dual stage separators 45 and vortex eliminators 62 into the tanks 61. However, after a certain time of operation, the tanks and their air release bags 64 require cleaning. To accomplish this, as previously explained, the blower 55 for the tank and bag requiring cleaning is shut down through its on-off switch and the other blower 55 of the system remains in operation. This can be accomplished manually or by means of an automatic timer, as previously described.

When done manually, the blower 55 is turned off through its on-off switch for one tank 61 during the emptying of such tank into the receptacle 66, and at no other time. With the blower of the other tank not undergoing emptying in full operation, the last remaining flour dust in the tank being emptied and in its air release bag 64 will be vacuumed through the screens 56 and through the active blower 55 and into the tank 61 connected therewith. This vacuum cleaning operation is accomplished without releasing flour dust into the atmosphere, because the vacuum is effective even near the bottom of the sleeve 67 and receptacle 66 for the tank being vacuum cleaned.

The air release bag 64 of the tank being vacuum cleaned will collapse onto a support frame 71 provided in the air release bag, and this frame will prevent the flexible bag from turning inside out during the vacuum cleaning process. The cleaning process also effectively cleans the sifting screen 56 of the tank whose blower 55 has been shut down.

When the on-off switches of the blowers 55 are being operated alternately by an automatic timer as described previously the vacuum cleaning mode of operation will be the same in essence as it is under manual operation of the blower on-off switches. About every ten minutes, under timer control, which is preferred over manual control, each blower will be turned off for a ten to fifteen second interval to permit vacuum cleaning of the associated tank and air relese bag. At this time, the other blower of the system remains in operation. After the approximate ten minute period, the other blower is turned off automatically by the timer and the blower first turned off by the timer is automatically restarted.

Thus, with either manual or automatic control of the two blowers 55 through their on-off switches, the tanks 61 and their air release bags are alternately vacuum cleaned without shutting down the recycling system. The system can still operate with good efficiency while only one blower 55 is running and the other one is shut down for vacuum cleaning, as described. The arrangement maintains the bags 64 in a clean state which is necessary for efficient operation of the system.

It can be seen that the previously-stated advantages of the invention are fully realized in an economical manner by the operation of a relatively simple apparatus. Large amounts of costly flour are reclaimed for subsequent use while a heathful atmosphere is being maintained for workers. Exposed machinery surfaces are kept clean, resulting in improved sanitation.

It should be noted that the blowers 55 create vacuum in the head 27, hose 41, dual stage separator 45 and pipes 53 connected with the blowers. However, simultaneously, the blowers 55 deliver clean sifted flour through the vortex eliminators 62 into the tanks 61 under positive pressure.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A flour recycling system comprising a compressed air and vacuum head adapted to be placed over a bakery product conveyor line to remove flour from all external surfaces of bakery product units, a remotely located vacuum assembly including a centrifugal separator means, a pair of independently operable blowers connected with the separator means, a pair of sifter screens connected between the blowers and separator means, and a pair of reclaimed flour tanks having flour outlets connected with outlets of said blowers, and an elongated flexible hose connected between said compressed air and vacuum head and an inlet of the separator means.

2. A flour recycling system as defined in claim 1, and a wheeled stand carrying said vacuum assembly whereby the assembly can be placed at a convenient location remote from the bakery product conveyor line and said head.

3. A flour recycling system as defined in claim 1, and said centrifugal separator means comprising a dual stage separator in which flour with entrained dough particles is subjected to vacuum induced centrifugal flow within two communicating chambers having perpendicular axes, and said sifter screens defining the outlets of one of said chambers of the separator means.

4. A flour recycling system as defined in claim 1, and said compressed air and vacuum head comprising a hood-like body portion of a size to completely span a bakery product conveyor belt transversely and having lower ambient air inlet passages and a top outlet connected with one end of said elongated flexible hose, an apertured compressed air pipe means spanning the hoodlike body portion transversely and being adapted to direct multiple streams of compressed air downwardly on inclined axes toward said bakery product conveyor line to act on bakery products and remove flour from their bottom surfaces while flour is being removed simultaneously from the other surfaces of the bakery product units by the action of vacuum being created within said head by said blowers.

5. A flour recycling system as defined in claim 4, and a pair of baffle plates within said head near the opposite sides thereof including lower inclined converging extensions and defining with the side walls of said head substantially vertical ambient air passages, said extensions serving to direct compressed air downwardly and inwardly toward bakery product units near the opposite sides of said head.

6. A flour recycling system as defined in claim 1, and said flour outlets of the reclaimed flour tanks comprising elongated flexible tubular sleeves secured dependingly to the bottoms of said tanks, and means on said flexible tubular sleeves near their tops to secure lower portions of the sleeves elevated when the sleeves are tied off and closed somewhat below the bottoms of said tanks.

7. A flour recycling system as defined in claim 6, and said tanks comprising upright axis tanks having lower tapered discharge ends to which said elongated flexible tubular sleeves are attached, and mechanical vibrator units on said lower tapered discharge ends.

8. A flour recycling system as defined in claim 7, and flexible air release bags on the tops of said tanks covering the tanks and preventing the escape of flour from the tops of the tanks.

9. A flour recycling system as defined in claim 1, and a pair of pipes connected between outlets of the separator means and inlets of said blowers and being coaxially aligned with said sifter screens.

10. A flour recycling system as defined in claim 9, and a vortex eliminator disposed within each reclaimed flour tank and being connected with an outlet of one of said blowers.

11. A flour recycling system comprising a compressed air and vacuum head adapted to be placed over a bakery product conveyor line to remove flour from all external surfaces of bakery product units, a remotely located vacuum assembly and means to support said assembly, an elongated flexible hose interconnecting said assembly and said compressed air and vacuum head, said assembly comprising a pair of reclaimed flour tanks, a pair of independently operated blowers having outlet means connected into said tanks, a separator unit having an inlet connected with said elongated flexible hose and having a pair of outlets, a pair of sifter screens across said outlets of the separator unit, and a pair of pipes connected between the outlets the separator unit and inlets of said blowers, the arrangement being such that one blower associated with one tank can be stopped and that tank can be vacuum cleaned by the operation of the blower associated with the other tank while the system continues to operate.

12. A flour recycling system as defined in claim 11, and said separator unit comprising a two-stage unit having a lower chamber and an upper chamber, the lower chamber being connected to said elongated flexible hose, said sifter screens being disposed in the upper chamber and said pipes leading from the upper chamber.

13. A flour recycling system as defined in claim 12, and the upper chamber having an access door equipped with a transparent window to enable viewing the sifter screens.

14. A flour recycling system as defined in claim 12, and a drop bottom on the lower chamber to facilitate emptying the lower chamber.

15. A flour recycling system as defined in claim 14, and the upper and lower chambers being cylindrical and having perpendicular axes and having substantially tangential inlets, and a sleeve within the lower chamber spaced concentrically with the side wall of the lower chamber and having a lower end terminating somewhat above said drop bottom, the lower chamber communicating with the upper chamber through said sleeve.

16. In a flour recycling system, a mobile vacuum separator assembly comprising a pair of upright reclaimed flour tanks having air release bags and lower flour discharge ends including adjustable length flexible outlet sleeves through which reclaimed flour can be delivered into open top containers, a dual stage centrifugal flow separator between said tanks with one stage thereof adapted for connection with a flour delivery hose leading to a remote location of bakery products having flour thereon, the other stage of the separator having dual outlets covered by sifter screens in opposing coaxial relationship, a pair of independently operated blowers, one for each tank, having positive pressure outlets connected in the tanks and communicating with vortex eliminators in the tanks, the blowers having vacuum inlets exteriorly of the tanks, and conduit means interconnecting the blower inlets and the outlets of said other stage of the separator adjacent to the sifter screens.

* * * * *